United States Patent [19]

Holland et al.

[11] 3,825,268

[45] July 23, 1974

[54] SELECTABLE PLAY MECHANISM FOR STATIONARY RECORD

[75] Inventors: Andrew M. Holland, Los Angeles; William B. Pester, Palos Verdes Peninsula, both of Calif.

[73] Assignee: Mattel, Inc., Hawthorne, Calif.

[22] Filed: July 6, 1972

[21] Appl. No.: 269,335

[52] U.S. Cl. .................................. 274/9 C, 353/19

[51] Int. Cl. ......................... G03b 31/06, G11b 3/40

[58] Field of Search ........... 274/9 C, 9 RA, 13, 1 G, 274/1; 353/16, 17, 18, 19

[56] References Cited

UNITED STATES PATENTS

| | | | |
|---|---|---|---|
| 851,311 | 4/1907 | Palmer | 274/9 C |
| 3,302,520 | 2/1967 | Dimitracopoulos | 274/9 C |

*Primary Examiner*—Louis R. Prince
*Assistant Examiner*—Willis Little
*Attorney, Agent, or Firm*—Max E. Shirk; Franklin D. Jankosky

[57] ABSTRACT

A simple toy phonograph for playing a stationary record of the type which has several interleaved spiral grooves with lead-in portions circumferentially spaced about the record. A rotatable carrier carries a tone arm whose stylus can enter any of the grooves, and also carries a mechanical speaker assembly whose piston is biased against the tone arm to pick up vibrations from it. A cam also mounted on the rotatable carrier is moved by the tone arm when it enters the end of a spiral groove, so that the cam lifts the speaker piston away from the record, to allow the tone arm to lift from the record and pivot to a position over the outside of the record where the tone arm can drop into another lead-in portion of a record groove.

10 Claims, 5 Drawing Figures

SELECTABLE PLAY MECHANISM FOR STATIONARY RECORD

BACKGROUND OF THE INVENTION

This invention relates to toy phonograph apparatus, and more particularly to toy phonographs for playing stationary records.

Some types of records are preferably maintained stationary while they are played. For example, a record disc with many circumferentially spaced transparent pictures can carry an equal number of record grooves that define sounds or sayings corresponding to the pictures. The record disc must be maintained stationary during projection of one of the pictures on a viewing screen, so that a phonograph is required which can play a stationary record groove. In order to keep the cost of the phonograph as low as possible, which is very important in toy applications, it is generally necessary to resort to mechanical speaker cone assemblies. If an ordinary acoustical speaker cone assembly is utilized together with a rotating tone arm, then a mechanical coupling would be required to carry vibrations picked up by the tone arm to the speaker cone. In addition, if the tone arm is to enter the particular record groove corresponding to the picture being viewed, then an apparatus is required to assure that the tone arm will enter a particular record groove rather than a randomly selected one each time the record is played.

SUMMARY OF THE INVENTION

In accordance with one embodiment of the present invention, a simple toy phonograph is provided which can play a stationary record, and which can play a selected one of several interleaved spiral record grooves on the record. The phonograph includes a platform for supporting a stationary record, and a rotatable carrier. The carrier carries a tone arm for playing a record groove and a speaker cone assembly for contacting the tone arm and mechanically amplifying the vibrations it picks up. The tone arm is pivotally mounted on the carrier so it can lift the piston of the speaker assembly away from the record, thereby permitting the tone arm to move off the record so it is free to pivot back to a position over the outside edge of the record. When the cam is released by the tone arm, the cam lies at a position where it can contact a stationary stop member on the phonograph housing. When the carrier rotates to a position where the cam reaches the stop, the carrier is stopped with the tone arm lying at a known position about the record. Accordingly, when the phonograph is next started and the tone arm moves down against a record, the tone arm stylus will enter a particular one of the record grooves.

The novel features of the invention are set forth with particularity in the appended claims. The invention will best be understood from the following description when read in conjunction with the accompanying drawings.

DESCRIPTION OF THE PREFERRED EMBODIMENT

Figure 1:
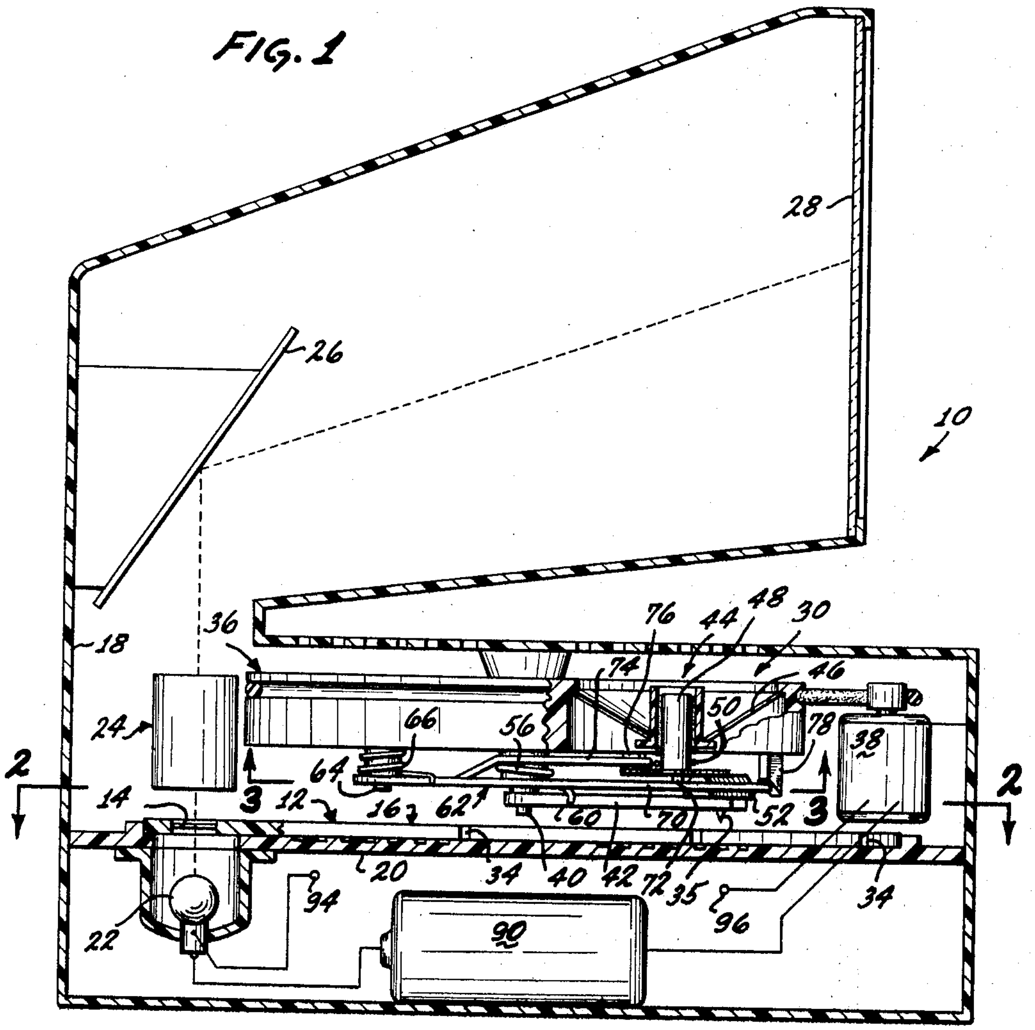
FIG. 1 is a sectional side elevation view of a phonograph constructed in accordance with the invention.

As shown in FIG. 1, a playing and viewing apparatus 10 is provided for playing a disc-shaped optical and sound record 12 which includes several transparent pictures or transparancies 14 circumferentially spaced about the periphery of the record, and several spiral record grooves 16. The playing device includes a housing 18 with a stationary platform 20 that supports the record while one of the transparencies 14 is viewed and a corresponding record groove 16 is played. A lamp 22 illuminates one of the transparencies 14 which lies over it, so that light passes through a lens assembly 24 and is reflected by a mirror 26 onto a viewing screen 28. The lens 24 forms an image of the transparency on the screen 28 for viewing by a child. At the same time, a sound playing mechanism 30 plays one of the record grooves 16 which corresponds to the particular transparency 14 which is being viewed.

Figure 2:
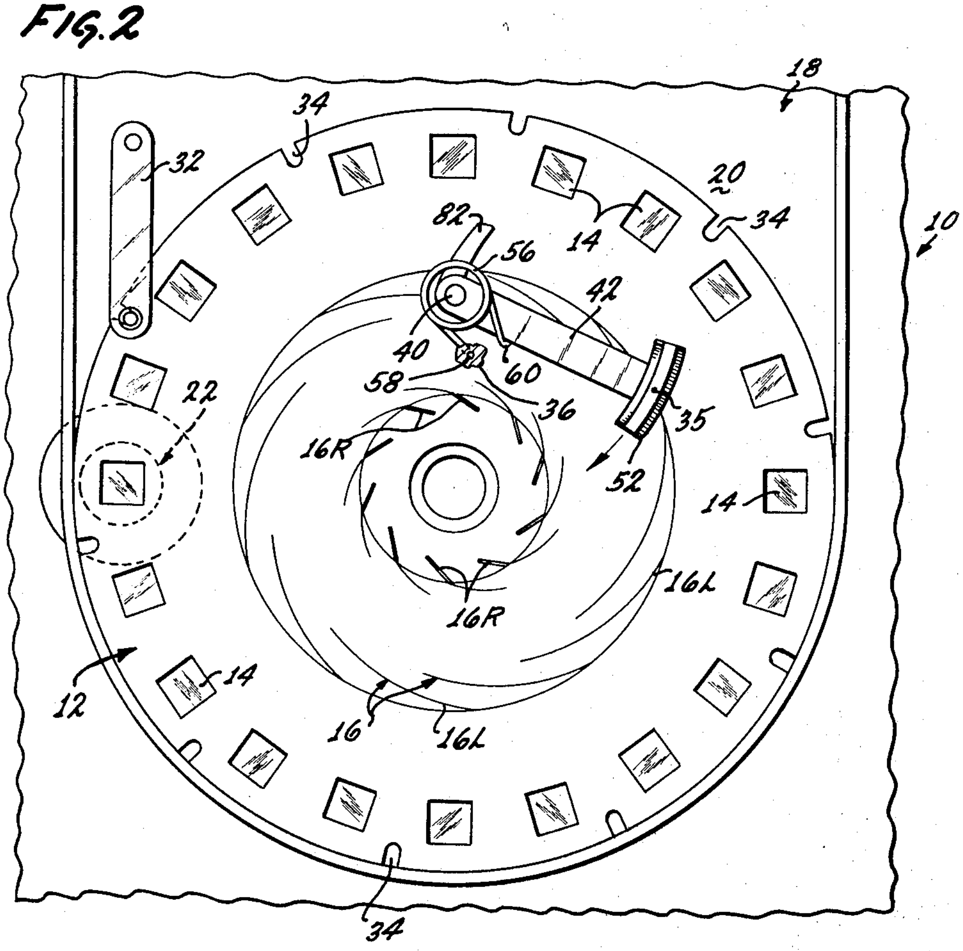
FIG. 2 is a view taken on the line 2—2 of FIG. 1.

Although the record 12 is stationary during the playing of a record groove, it can be rotatably indexed to different positions so that different ones of the transparencies 14 can be viewed. An index plate or positioning spring 32 (FIG. 2) which can enter one of several notches 34 at the edge of the record, holds the record against movement during viewing and playing. However, spring 32 may be deflected out of a notch so that the record 12 can be turned until positioning spring 32 falls into another notch. The next transparency then can be viewed while the next groove is played. It may be noted that the particular record 12 which is shown has a series of grooves 16 on each of its opposite faces, and some of the transparencies 14 correspond to the grooves on one face while other transparencies correspond to the grooves on the other face. At any rotational position of the record 12 on the phonograph platform, a particular one of the record grooves 16 should be played that corresponds to the particular transparency which is viewed. The sound playing mechanism 30 is constructed to play a particular record groove corresponding to the transparency being viewed, at any position of the record on the housing.

The record grooves 16 have circumferentially spaced lead-in portions 16L. When a needle or stylus 35 of the playing mechanism enters a lead-in portion 16L, it will continue to follow the particular groove it has entered until the stylus reaches a run out groove portion 16R of the groove. The stylus 35 should then be lifted away from the record and returned to the periphery of the grooved region of the disc so that the stylus is ready to enter a lead-in portion 16L during the next playing of the record. The particular groove which is played is controlled by controlling the initial position of the stylus 35 at which it is first lowered against the periphery of the grooved portion of the record where the lead-in portions 16L are located.

The playing mechanism 30 is designed for simple and low cost production, and yet to provide close control of the initial position of the stylus 35 at the beginning of record playing when the stylus moved down against the record to enter one of the grooves. The playing apparatus includes a carrier 36 which is rotatably mounted on the housing 10 and which is rotatably driven by an electric motor 38. The carrier 36 has a post 40 which pivotally supports a tone arm 42 on which the stylus 35 is mounted. The carrier also supports a speaker cone assembly 44 which mechanically amplifies vibrations picked up by the stylus 35. The speaker cone assembly includes a speaker cone 46, a piston 48 slideably mounted at the center of the cone, and a spring 50 which urges the piston 48 downwardly towards contact with a projecting portion 52 on the tone arm. A tone arm spring 56 has ends 58, 60 respectively attached to the carrier 36 and tone arm 42, to urge the tone arm up against the speaker piston 48, and also to urge the tone arm radially outwardly towards the periphery of the record groove region covered by the grooves 16. However, the spring force is light, so that the piston 48 can overcome it and push the tone arm down against the record. Also, the spiral record groove engaged by the stylus of the tone arm can force the tone arm to pivot about the post 40 so as to follow inwardly towards the run out portions 16R of the record grooves. Thus, after a record groove has played, it is only necessary to lift the speaker cone piston 48 to allow the tone arm to move off the record, and the tone arm then automatically pivots to the periphery of the record grooves.

Figure 3:
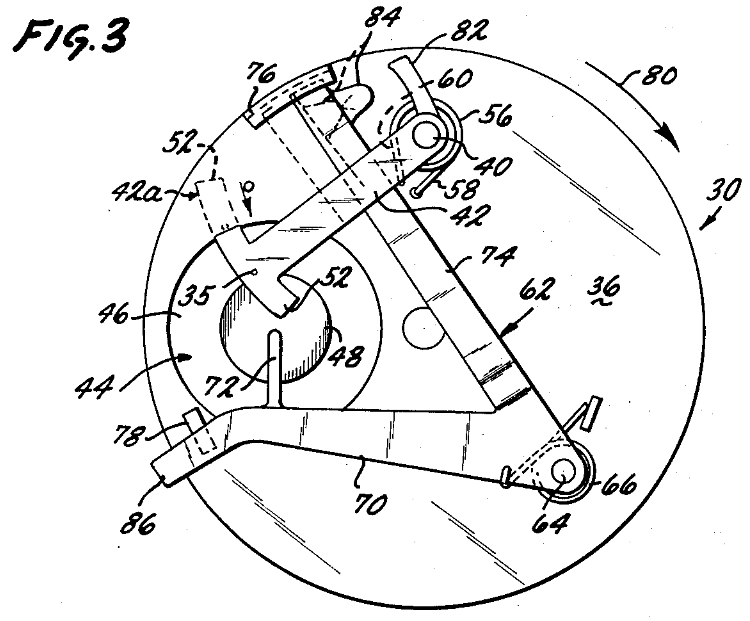
FIG. 3 is a view taken on the line 3—3 of FIG. 1, showing the phonograph during the playing of a record groove.
Figure 4:
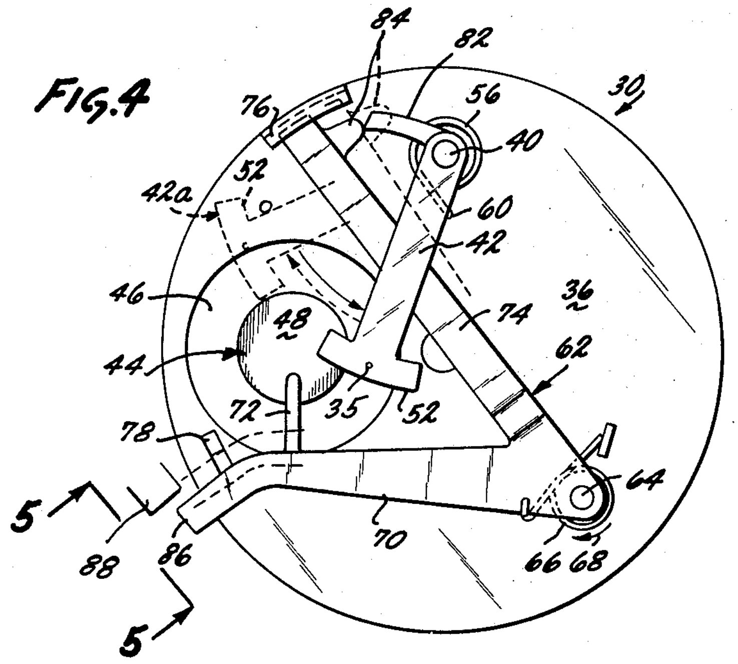
FIG. 4 is a view similar to FIG. 3, but showing the apparatus as the tone arm enters the end portion of a record groove.

The control of tone arm pivoting and control of the initial position of the carrier 36 when a groove is played, is obtained through a cam 62, which is shown in FIGS. 3 and 4. The cam 62 is mounted on the carrier 36 by a post 64 that permits the cam to pivot and wobble. A spring 66 urges the cam to pivot in the direction of arrow 68, and also urges the cam to wobble so that an arm 70 of the cam and an extension 72 thereon tend to move up against the piston 48 of the speaker cone assembly. The cam also has another arm 74 which extends to a guide 76 which forms a slot for guiding the cam in pivotal motion so that the arm 74 does not move up and down appreciably.

During playing of a record groove, the cam 62 is held in the position shown in FIG. 3 wherein the arm 70 lies under a retainer member 78 so that the arm extension 72 cannot move up against the speaker piston 48. This allows the speaker piston 48 to push down against the tone arm 42 so that the tone arm stylus is maintained in engagement with a record groove. As the carrier 36 rotates in the direction of arrow 80, the tone arm 42 slowly pivots from an initial position 42a where its stylus entered the lead-in portion of a record groove to the position shown in FIG. 3, and finally to the position shown in FIG. 4. At the position of the tone arm 42 shown in FIG. 4, its stylus 35 has entered the run out portion 16R of a record groove. The tone arm must then be released from the record so it can lift off the record and move radially outwardly.

In order to release the tone arm from the record, the tone arm is provided with a camming or operating arm 82 that can move against the projection 84 on the cam arm 74. As the tone arm reaches the position of FIG. 4, the operating arm 82 pushes against the projection 84, thereby causing the cam 62 to pivot in a direction opposite to arrow 68. As the cam 62 pivots, its other arm 70 moves off the retainer member 78 which has been keeping the cam away from the speaker piston 48. Once the cam arm 70 is released from the retainer member 78, the extension 72 on the cam arm can move up against the speaker piston 48 and push it up and away from the record. This allows the stylus end of the tone arm 42 to also move up under the urging of its spring 56, so that the tone arm moves off the record and its spring 56 can return it to its initial position 42a where it lies over the lead-in portion of the record grooves. The retainer member 78 and speaker piston 48 therefore serve as holding means for preventing movement of the tone arm away from the record, until the tone arm reaches the end of a spiral record groove. The operating arm 82 on the tone arm then disengages the cam from the retainer member to allow the tone arm to move off the record. The spring 56 which urges the tone arm away from the record, the speaker piston 58 that urges the tone arm towards the record, and the cam 62 which can be released to overcome the speaker piston force or which can be retained in a position where it allows the piston to push down the tone arm, together act as tone arm operating means that moves the tone arm towards and away from the record at proper times in the playing cycle.

Figure 5:
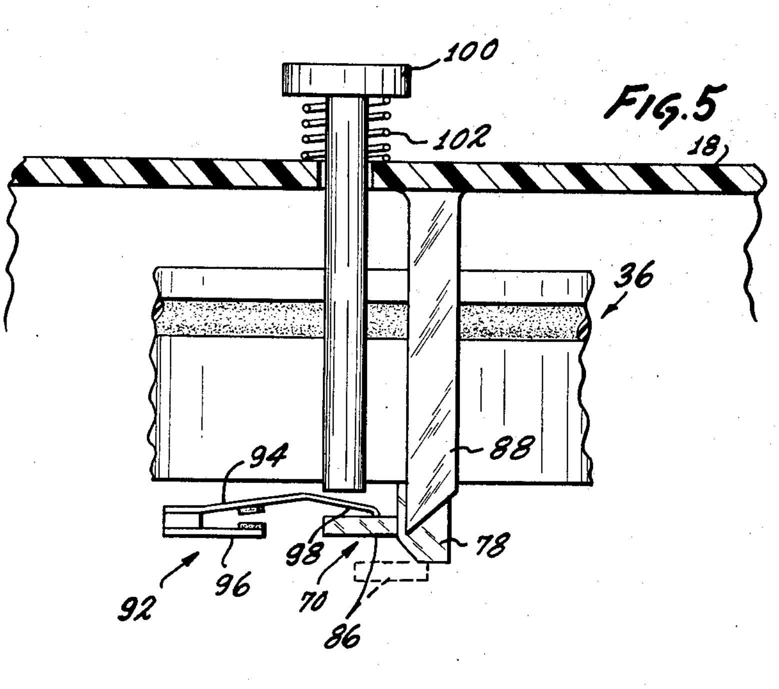
FIG. 5 is a view taken on the line 6—6 of FIG. 4.

At the end of play of a record groove it is also necessary to stop the driving of the carrier, and also to stop the carrier at a particular rotational position. If the carrier can be stopped at a particular position then the tone arm stylus will also be stopped at a known position and therefore it will enter a particular one of the many spiral record grooves when the record is next played. In order to control the stopping of the carrier, the cam arm 70 is provided with an end portion 86 that projects past the boundaries of the carrier. A carrier stop 88 is mounted on the housing of the playing device to contact the cam arm end 86. As shown in FIG. 5, the stop 88 normally does not extend low enough to contact the cam arm 70 during the playing of a record when the arm 70 lies under the retainer member 78 as indicated by phantom lines in the figure. However, when the arm 70 is released from the retainer member 78 and moves up to the position shown in solid lines in FIG. 5, or to a higher position, the arm 70 can contact the stop 88. The arm 70 then halts any further rotation of the carrier 36 and any of the mechanisms on it including the tone arm. Thus, as the stylus of the tone arm reaches the end of a spiral record groove, the cam is moved so that its arm 70 is released to rise to a position in the path of the stop 88, and the arm 70 will hit the stop to prevent any further rotation of the carrier. As a result, the stylus 35 is stopped at a predetermined position about the record so that it will enter a particular one of the record grooves when it next moves down against the record.

In addition to stopping the carrier 36 at a predetermined position at the end of record groove play, it is also necessary to de-energize the electric motor 38 (FIG. 1) which drives the carrier. The motor is energized by a battery 90 which is connected to the motor through a switch shown in FIG. 5 at 92. The switch has a pair of resilient electrically conductive contacts 94, 96 which are mounted on the housing and which are resiliently biased towards contact with each other. When the cam arm 70 is released from the retainer 78, so it can rise to the position shown in solid lines in FIG. 5, it is in a position to contact an end portion 98 of one switch contact 94. As the cam reaches the stop 88 on the housing, it deflects the contact portion 98 upwardly and disengages the contact 94 from the other contact 96. Accordingly, the motor is de-energized and therefore no longer tends to drive the carrier 36.

In order to restart the phonograph, a child depresses a pushbutton 100 which is slideably mounted on the housing 18. As the pushbutton is depressed, a lower end of it pushes down the end portion 98 of the switch contact 94. The end portion 98 pushes down on the cam arm 70 so that it is moved under the retainer 78 on the carrier and can be held thereon until released therefrom at the end of the next playing cycle. Depression of the button 100 also deflects the switch contact 94 to keep it out of engagement with the other contact 96 and thus prevent carrier movement until the cam has been moved under the retainer. When the pushbutton 100 is released, it is moved up by a spring 102, and the switch contacts 94, 96 can engage one another and reenergize the motor.

Thus, the invention provides a simple toy phonograph for playing a stationary record, the phonograph having a tone arm and mechanical speaker assembly mounted on a rotating carrier to eliminate the need for a complex mechanical coupling between the tone arm and speaker. A cam which is also rotatably mounted on the carrier, automatically releases the tone arm to move off the record at the end of playing of a groove. The cam also causes the carrier to stop at a predetermined position and de-energizes the motor to cease driving the carrier. The cam can be positioned to directly lift the tone arm instead of the speaker piston that pushes down the tone arm. The spiral record grooves can, of course, have their lead-in portions either at the radially outermost region of the grooved area, as described above, or at the radially innermost region.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A toy phonograph for playing a stationary record with a spiral groove comprising:

a housing having a record supporting portion for supporting the record;

a carrier rotatably mounted on said housing;

means for rotatably driving said carrier;

a tone arm mounted on said carrier so it can follow along the spiral record groove between the radially inner and outer portions thereof;

speaker cone means mounted on said carrier to rotate with it;

coupling means for mechanically coupling said tone arm to said speaker cone means to transmit vibrations to said speaker cone means;

said tone arm being mounted to move toward and away from said record supporting portion and being biased toward said record supporting portion;

cam means moveably mounted on said carrier and operable to move said tone arm away from said record; and operating means responsive to the position of said tone arm for operating said cam means when said tone arm reaches the end of a spiral record groove.

2. The toy phonograph described in claim 1 wherein:

said operating means includes spring means urging said cam means toward a position to cause movement of said tone arm away from said record, holding means for preventing movement of said cam means towards said last mentioned position, and means on said tone arm for disengaging said cam means from said holding means when said tone arm reaches a predetermined position wherein it is at the end of a spiral record groove.

3. The toy phonograph described in claim 1 wherein:

said speaker cone means includes a speaker cone, a speaker piston movable towards and away from said tone arm, and first spring means for urging said piston means in a direction toward said tone arm;

said tone arm means includes a tone arm and second spring means urging said tone arm toward said piston means with a smaller force than said first spring means; and said cam means is movable against said piston means to move said piston means away from said record supporting portion so that said tone arm can move away from said record supporting portion.

4. The toy phonograph described in claim 1 wherein:

said tone arm is movable toward and away from the record supporting portion; and including a cam moveable on said carrier between a first position wherein it permits said tone arm to remain away from the record supporting portion and a second position wherein it permits said tone arm to move against said record supporting portion;

means for urging said cam toward said first position;

retainer means mounted on said carrier for retaining said cam in said second position;

means for releasing said cam from said retainer means when said tone arm reaches a predetermined end-of-play position on said carrier; and a stop mounted on said housing to engage said cam when it is in said first position and thereby halt rotation of said carrier.

5. The toy phonograph described in claim 4 wherein:

said means for driving said carrier includes an electric motor, a current source, and first and second switch contacts mounted on said housing for connecting said motor to said current source, said first contact positioned to be deflected away from said second contact by said cam when it is in said first position; and starting means for moving said cam towards said second position while deflecting said second contact so it remains out of engagement with said first contact until after said cam has been moved to said second position.

6. A toy phonograph and record system comprising:

a disc record having a plurality of pictures circumferentially spaced thereon, and having a plurality of interleaved spiral record grooves with lead-in portions circumferentially spaced thereon;

a housing;

means for supporting said record so that it can be rotated to different positions on said housing;

a carrier rotatably mounted on said housing;

means for rotatably driving said carrier;

a tone arm mounted on said carrier to move against and away from said supporting means and to follow radially along the spiral record groove as said carrier rotates the tone arm about the groove;

speaker cone means mounted on said carrier and mechanically coupled to said tone arm;

tone arm operating means moveably mounted on said carrier and operable between a first position to move said tone arm toward said record supporting means and a second position to move said tone arm away from said record supporting means, said tone arm operating means having a projecting portion; and a stop mounted on said housing and positioned to engage said projecting portion when said tone arm operating means is in said first position, to stop said carrier.

7. The toy phonograph described in claim 6 wherein:

said means for driving said carrier includes an electric motor and first and second resilient switch contacts for controlling energization of the motor, said contacts biased towards engagement with each other;

said tone arm operating means deflects said first contact away from said second contact when said tone arm operating means is in said first position; and including restart means for moving said tone arm operating means to said second position while deflecting said second contact away from engagement with said first contact.

8. A toy phonograph comprising:

a housing;

means for supporting a record on said housing;

a carrier rotatably mounted on said housing;

a speaker cone mounted on said carrier;

a speaker piston slideably coupled to said speaker cone;

a spring urging said piston toward said record supporting means;

a tone arm mounted on said carrier and having a portion disposed between said piston and record supporting means;

means for urging said tone arm toward said piston;

cam means moveable between a first position wherein it holds said piston away from said record supporting means and a second position wherein it releases said piston to move towards said record supporting means;

retainer means for holding said cam means in said second position; and means for releasing said cam means from said retainer means.

9. The toy phonograph described in claim 8 wherein:

said tone arm is pivotally mounted on said carrier to move with a radial component relative to the axis of rotation of said carrier; and said means for releasing said cam means is moveable by said tone arm to release said cam means when said tone arm reaches a predetermined radial position.

10. A toy phonograph and record system comprising:

a disc record having a plurality of interleaved spiral record grooves with lead-in portions circumferentially spaced thereon;

a housing;

means for supporting said record so that it can be rotated to different positions on said housing;

a carrier rotatably mounted on said housing;

means for rotatably driving said carrier;

a tone arm mounted on said carrier to move against and away from said supporting means and to follow radially along the spiral record groove as said carrier rotates the tone arm about the groove;

speaker cone means mounted on said carrier and mechanically coupled to said tone arm;

tone arm operating means moveably mounted on said carrier and operable between a first position to move said tone arm toward said record supporting means and a second position to move said tone arm away from said record supporting means, said tone arm operating means having a projecting portion; and a stop mounted on said housing and positioned to engage said projecting portion when said tone arm operating means is in said first position, to stop said carrier.

* * * * *